United States Patent
Wietelmann

(10) Patent No.: US 12,062,785 B2
(45) Date of Patent: Aug. 13, 2024

(54) METHOD OF PRODUCING A RECHARGEABLE HIGH-ENERGY BATTERY HAVING AN ANIONICALLY REDOX-ACTIVE COMPOSITE CATHODE

(71) Applicant: ALBEMARLE GERMANY GMBH, Frankfurt am Main (DE)

(72) Inventor: Ulrich Wietelmann, Friedrichsdorf (DE)

(73) Assignee: ALBEMARLE GERMANY GMBH, Frankfurt am Main (DE)

( * ) Notice: Subject to any disclaimer, the term of this patent is extended or adjusted under 35 U.S.C. 154(b) by 698 days.

(21) Appl. No.: 17/272,853

(22) PCT Filed: Sep. 5, 2019

(86) PCT No.: PCT/EP2019/073708
§ 371 (c)(1),
(2) Date: Mar. 2, 2021

(87) PCT Pub. No.: WO2020/049104
PCT Pub. Date: Mar. 12, 2020

(65) Prior Publication Data
US 2021/0320296 A1  Oct. 14, 2021

(30) Foreign Application Priority Data
Sep. 5, 2018  (DE) ..................... 10 2018 215 074.5

(51) Int. Cl.
| | |
|---|---|
| *H01M 4/505* | (2010.01) |
| *H01M 4/04* | (2006.01) |
| *H01M 4/38* | (2006.01) |
| *H01M 4/40* | (2006.01) |
| *H01M 4/525* | (2010.01) |
| *H01M 4/583* | (2010.01) |

(52) U.S. Cl.
CPC ......... *H01M 4/505* (2013.01); *H01M 4/0435* (2013.01); *H01M 4/382* (2013.01); *H01M 4/386* (2013.01); *H01M 4/387* (2013.01); *H01M 4/405* (2013.01); *H01M 4/525* (2013.01); *H01M 4/583* (2013.01)

(58) Field of Classification Search
CPC .... H01M 4/505; H01M 4/0435; H01M 4/382; H01M 4/405; H01M 4/525
USPC ........................................................ 429/209
See application file for complete search history.

(56) References Cited

U.S. PATENT DOCUMENTS

| | | | |
|---|---|---|---|
| 9,490,482 B2 | 11/2016 | Wietelman | |
| 2012/0225356 A1* | 9/2012 | Wietelmann | C01G 23/005 29/623.1 |
| 2015/0171428 A1* | 6/2015 | Fujiki | H01M 10/052 429/304 |
| 2018/0047519 A1 | 2/2018 | Tour et al. | |
| 2018/0145322 A1* | 5/2018 | Choi | H01M 4/525 |

FOREIGN PATENT DOCUMENTS

| | | |
|---|---|---|
| DE | 102010044109 A1 | 5/2011 |
| JP | 2011210609 A | 10/2011 |
| KR | 20160041004 A | 4/2016 |
| WO | WO-2017106168 A1 * | 6/2017 ........ H01M 10/0525 |

OTHER PUBLICATIONS

Applegate, D. S., and Poeppel, R.B., "CRITIC-I-Instrumented Lithium Oxide Irradiation: Part 1-Lithium Oxide Fabrication and Characteristics"; Fabrication and Properties of Lithium Ceramics (Advances in Ceramics, vol. 25). Eds. Hastings, I.J. and Hollenberg, G.W. The American Ceramic Society, 1989. pp. 111-116.

Bie, Yitian et al., "Li2O2 as a cathode additive for the initial anode irreversiblity compensation in lithium-ion batteries," Chem. Commun., 20, 53, pp. 8324-8327.

Holtstiege, Florian et al., "Pre-Lithiation Strategies for Rechargeable Energy Storage Technologies: Concepts, Promises and Challenges," Batteries, 2018, 4, 39 pages.

Lau, K.C. et al., "Density Functional Investigation of the Thermodynamic Stability of Lithium Oxide Bulk Crystalline Structures as a Function of Oxygen Pressure," J. Phys. Chem. C, 2011, 115, 23625-23633.

Lu, Jun et al., "Aprotic and Aqueous Li—O2 Batteries," Chem. Rev., 2014, 114, 5611-5640.

Sun, Yongming et al.; "High-capacity battery cathode prelithiation to offset initial lithium loss," Nature Energy, 2016, 1, article No. 15008, 7 pages.

Wardinsky, Michael D. et al., "Investigation Of Lithium Peroxide As The Positive Electrode Matenal In A Solid-State Thin-Film Lithium Battery." In Barnett, B.M., et al., eds., Proceedings of the Symposium on New Sealed Rechargeable Batteries and Supercapacitors in Proceedings (Electrochemical Society), vol. 93-23. Paper presented at Symposium on New Sealed Rechargeable Batteries and Supercapacitors, Honolulu, Hawaii, 389-400. Pennington, NJ: The Electrochemical Society Inc.

(Continued)

Primary Examiner — James M Erwin
(74) Attorney, Agent, or Firm — KDW Firm PLLC

(57) ABSTRACT

The invention relates to a method for producing a rechargeable high-energy battery with an anion-redox-active composite cathode containing lithium hydroxide as the electrochemically active component, which is mixed and contacted with electronically or mixed-conductive transition metals and/or transition metal oxides, so that an electronically or mixed-conductive network is formed, this mixture is applied to a current drain, and the composite cathode thus formed is placed in a cell housing together with a separator, a lithium-conductive electrolyte and a lithium-containing anode, so that an electrochemical cell is present and is subjected to at least one initial forming cycle.

17 Claims, No Drawings

(56) References Cited

OTHER PUBLICATIONS

Zhu, Zhi et al., "Anion-redox nanolithia cathodes for Li-ion batteries," Nature Energy, 2016, 1, article No. 16111, 7 pages.

* cited by examiner

METHOD OF PRODUCING A RECHARGEABLE HIGH-ENERGY BATTERY HAVING AN ANIONICALLY REDOX-ACTIVE COMPOSITE CATHODE

REFERENCE TO RELATED APPLICATIONS

This application is the National Stage of International Patent Application No. PCT/EP2019/073708, filed on Sep. 5, 2019, which application claims priority from German Patent Application No. 10 2018 215 074.5, filed Sep. 5, 2018, the disclosures of which are incorporated herein by reference.

The invention relates to a process for manufacturing a rechargeable high-energy battery with an anion-redox active composite cathode.

PRIOR ART

The operating principle of commercial rechargeable lithium-ion batteries is based on an insertion mechanism: both the negative electrode (anode) and the positive electrode (cathode) are made of materials that are able to store (insert) lithium ions without fundamental changes to the microstructure. While the anode material is a carbon-based material—graphite or hard carbon—the cathode active materials consist of transition metal oxides. The transition metals in the latter oxides are redox active, i.e. they change their oxidation state during charging or discharging. This is illustrated by the following exemplary reaction:

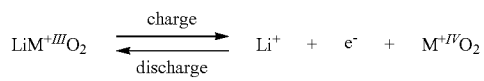

M = Metall, e.g. Ni, Co, Mn

With the currently used cathode materials, the oxidation state of the redox-active metal centers is only changed by one step when charging/discharging the battery. In the above case, the oxidation state changes between +III and +IV. For this reason, the capacity of the cathode materials is relatively low. In the case of the classical cathode material $LiCoO_2$, the theoretical capacitance is 274 mAh/g, of which only about 135 mAh/g can be used in practice. The graphitic material used for the anode also has a relatively low capacitance of 372 mAh/g for the limit stoichiometry $LiC_6$. —Consequently, the theoretical energy density for the graphite ($C_6$)/$LiCoO_2$ system is also unsatisfactorily low, at about 380 Wh/g. A further disadvantage of lithium ion batteries is that the cathode materials used are predominantly those of the less available elements such as cobalt and nickel. It is feared that these metals are not available in sufficient quantities to ensure a comprehensive supply of lithium batteries for global electromobility and stationary energy storage.

As an alternative to cation redox-active positive electrode materials, open battery systems are being investigated. These contain a porous structure open to the environment, mostly consisting of carbon, whose surface is coated with a catalyst containing precious metals so that diffused oxygen can be bound to lithium oxides (oxygen reduction reaction):

$$Li^+ + e^- + O_2 \rightarrow LiO_2$$

In the initially formed product—lithium peroxide ($LiO_2$)—the oxygen has an average oxidation number of $-0.5$. Further uptake of lithium produces lithium peroxide ($Li_2O_2$) with an oxygen oxidation number of $-1$. The latter lithium oxide can be converted back into lithium and elemental oxygen in the presence of a metal catalyst that catalyzes oxygen oxidation by reversing the formation reaction:

$$Li_2O_2 \rightarrow 2Li^+ + 2e^- + O_2$$

The disadvantage is that the air electrode described above has only a very moderate power density and, above all, only very limited reversibility, so that this cathode form is still far from being used in practical applications. In addition, there is a strong gap of typically 0.5-1 V between the charging and discharging potential, so that the energy efficiency ("round trip efficiency") is completely unsatisfactory. The current technical challenges mean that commercialization of the lithium/air battery can be expected in 10-20 years at the earliest. For an overview see K. Amine et al., Chem. Reviews 2014, 5611-40, 114.

There are also efforts to use lithium oxides ($Li_2O$, $Li_2O_2$ and $LiO_2$) as active cathode materials that function according to ananion redox principle. Since all the lithium oxygen compounds mentioned are electronic insulators, they must be present in finely divided (amorphous or nanoparticulate) form or in very thin layers and the individual particles must be contacted by means of a conductive network. Conductive, finely divided metals such as many metal oxides and lithium metal oxides can be used for this purpose. Such systems are known in literature and only exemplary embodiments are mentioned here. A composite cathode consisting of 20% $Li_2O_2$, 20% carbon black and 60% PEO-$LiClO_4$ could be discharged/charged three times in an electrochemical cell with lithium foil as counter electrode (M. D. Wardinsky and D. N. Bennion, Proc. Electro chem. Soc. 1993, 93-23 (Proc. Symp. New Sealed Rech. Batt. and Supercapacitors, 1993, 389-400).

Lithium peroxide ($Li_2O_2$) can be contacted and cathodically completely decomposed by co-grinding with mixed-conductive $LiNi_{0.33}Co_{0.33}Mn_{0.33}O_2$ (Y. Bie et al., Chem. Commun. 2017, 53, 8324-7). Composites consisting of a mixture of Co-metal and $Li_2O$, both in nanoparticulate form, can also be cathodically completely decomposed (Y. Sun, Nature Energy, January 2016, 15008). The practical functionality of a battery full cell containing nanoparticulate lithiumoxides (a mixture of $Li_2O$, $Li_2O_2$ and $LiO_2$) embedded in a matrix of $Co_3O_4$ is known (Z. Zhu, Nature Energy, 25 Jul. 2016, 16111). To avoid oxygen release from the lithium oxides, a charge voltage of about 3-3.5 V vs $Li/Li^+$ must not be exceeded.

However, the use of lithium oxides as cathode active materials has practical disadvantages with regard to commercialization. Lithium superoxide ($LiO_2$) is thermodynamically not stable in crystalline form, but decomposes into $Li_2O_2$ and oxygen (K. C. Lau, Phys. Chem. C 115, 23625-33). Lithium peroxide is a strong oxidizing agent and decomposes in contact with water under oxygen evolution. Both of the above-mentioned compounds are therefore not safe to handle on a large scale. Lithium oxide $Li_2O$, although thermodynamically stable, is not commercially available. It is highly corrosive and can only be obtained by energy-intensive processes, e.g. the thermal decomposition of $Li_2CO_3$ at temperatures above about 1000° C. (R. B. Poeppel in: Advances in ceramics, Vol. 25, "Fabrication and properties of lithium ceramics", ed. I. J. Hastings and G. W. Hollenberg, 1989, 111-116).

Problem to be Solved

The problem to be solved by the invention is to provide a manufacturing process and an electrochemical storage system that can ensure an energy density of at least 500 Wh/kg, which is sufficiently high specifically for mobile applications. Furthermore, commercially readily available and safely manageable active materials with the lowest possible content of rare or poorly available metals should be used.

Solution of the Problem

The problem is solved by a method for manufacturing a rechargeable high-energy battery with an anion-redox active composite cathode, in which the anion-redox active composite cathode contains lithium hydroxide as the electrochemically active component, which is mixed and contacted with electronically or mixed conductive transition metals and/or transition metal oxides, so that an electronically or mixed-conductive network is formed, this mixture is applied to a current drain, and the composite cathode thus formed is placed in a cell casing together with a separator, a lithium-conductive electrolyte and a lithium-containing anode, so that an electrochemical cell is obtained. This is subjected to at least one initial forming cycle. In the case of a rechargeable high-energy battery whose positive electrode (cathode) consists of a composite material which contains lithium compounds selected from at least lithium hydroxide (LiOH) as the electrochemically active component, and optionally lithium oxide ($Li_2O$), lithium peroxide ($Li_2O_2$) and/or lithium superoxide ($LiO_2$), the cathode contains additional lithium hydride (LiH) at least after the first discharge cycle (i.e. in the lithium-rich state). This LiH is formed according to one of the equations (1) to (3), see below The electrochemically active components are embedded in an electronically or mixed-conductive network, which contains transition metal particles and/or electronically conductive transition metal oxides and, optionally, other conductivity enhancing materials.

At least the lithium oxygen compound lithium hydroxide (LiOH) and optionally another lithium oxygen compound selected from $Li_2O$, $Li_2O_2$ and $LiO_2$ is used for the production of the electrochemically active composite cathode material. Lithium hydroxide is commercially available and easy and safe to handle. The proportion of LiOH in the composite cathode material, based on the total content of the above lithium oxygen compounds, is at least 10 mol %, preferably at least 30 mol %.

The negative electrode (anode) contains at least one lithium-donating component or compound with an electrochemical potential of <2 V against the $Li/Li^+$ reference electrode. The lithium-donating, electrochemically active component or compound is selected from metallic lithium, a lithium containing metal alloy, a lithium nitrido transition metalate or composite materials, the electrochemically active component of which is a metal nitrogen compound embedded in a transition metal-containing electronically or mixed conductivity network.

When producing a rechargeable high-energy battery, preferably a secondary lithium battery containing a composite cathode according to the invention and an anode, the active materials of which have an electrochemical potential of <2 V against $Li/Li^+$, care must be taken to ensure proper balancing (i.e. weight matching) of the two electrodes with respect to their respective electrochemically mixed active ingredients. Proper balancing is characterized by the fact that the electrochemical active materials can be used as fully as possible. In the present case, this means in particular that before the first discharge cycle, the anode contains a molar quantity of electrochemically activatable, i.e. electrochemically extractable lithium from the anode, which corresponds to at least half, preferably at least the same and especially preferred at least twice the molar quantity of the LiOH content in the composite cathode. This is explained below.

When using LiOH in the cathode of a rechargeable lithium battery, lithium hydride (LiH) is formed during the first discharge cycle in addition to lithium oxide ($Li_2O$), lithium peroxide ($Li_2O_2$) and/or lithium peroxide ($LiO_2$). The general cathode half reactions during the first discharge of the galvanic cells correspond to at least one of the three following equations:

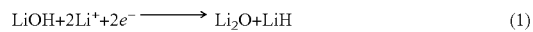

$$LiOH + 2Li^+ + 2e^- \longrightarrow Li_2O + LiH \quad (1)$$

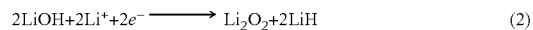

$$2LiOH + 2Li^+ + 2e^- \longrightarrow Li_2O_2 + 2LiH \quad (2)$$

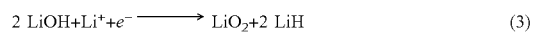

$$2LiOH + Li^+ + e^- \longrightarrow LiO_2 + 2LiH \quad (3)$$

As a result of the first discharge reaction, in addition to lithium hydride at least one lithium oxide compound is formed, which is anion redox active and is the electrochemically active cathode material used for the subsequent cycles. The inventors found out that the reactions (1) to (3) surprisingly only take place if sufficient electronic or mixed electronic/ionic contacting of the lithium hydroxide particles is ensured. Apart from this, the lithium hydroxide particles should preferably be present in finely divided form (nanoparticular). The same applies to other lithium oxygen compounds selected from $Li_2O$, $Li_2O_2$ and $LiO_2$ that may be present in the cathode material.

Since $Li_2O$ has the highest lithium content of the lithium oxygen compounds under consideration and thus a cathode with the highest theoretical electrochemical capacitance can be formed, reaction equation (1) with a molar ratio of 1:2 between LiOH:lithium extractable (i.e. electrochemically active) from the anode is particularly preferred.

The electrochemically active cathode material according to the invention in the lithium-rich form present after the first discharge cycle can in principle also be produced by mixing $Li_2O$ and/or another lithium oxygen compound and LiH. However, this method of production is not very advantageous, mainly for practical reasons. Lithium hydride is not stable against reactive air components like water vapor and carbon dioxide (decomposition to lithium hydroxide or lithium carbonate). Furthermore, lithium oxide is not commercially available and requires energy-intensive manufacturing processes.

During subsequent charge-discharge cycles further, sometimes irreversible, changes in the electrode composition take place. In contrast to the prior art (Z. Zhu, Nature Energy, 25 Jul. 2016, 16111), the cathode of the invention contains lithium hydride at least after the first discharge (i.e. in a lithium-rich state). Surprisingly, the lithium hydride formed in the first discharge cycle decomposes smoothly during the subsequent charge cycle, presumably according to the following reaction:

$$LiH \longrightarrow \tfrac{1}{2}H_2 + Li^+ + e^- \quad (4)$$

In addition to hydrogen gas, lithium is also released.

Rechargeable lithium batteries require the prevention of access to metallic lithium reactive gases and compounds for their operation. The air constituents oxygen, nitrogen, carbon dioxide, water vapor and other air trace components are reactive to lithium. Consequently, rechargeable lithium batteries must generally be operated in a closed state (i.e. filled in a hermetically sealed housing). In this case, hydrogen gas is formed at least during the first charge cycle. The hydrogen formed is not reactive with metallic lithium at moderate temperatures, but it would lead to an undesirable pressure build-up within a hermetically sealed battery cell. In order to avoid this undesirable effect, at least the first and, if necessary, further discharge/charge cycles must be performed in the open state. Such a procedure during the first cycle or cycles, the so-called forming cycles, is a known procedure. In order to avoid excessive contact of the battery contents with the environment, pressure equalization is generally performed by means of an open capillary tube which is closed after the gas-forming reaction or reactions have been completed.

The lithium formed during the first charge cycle travels in cationic form through the separator to the anode, where it is deposited in a metallic state or reacts with substances or compounds present there that are capable of receiving lithium. This can be an at least partially reversible reaction, such as with a graphitic material, a metal that receives lithium when forming an alloy, a low lithium metal alloy, and low lithium forms of lithium nitrido transition metalates and/or composite materials whose electrochemically active component is a metal nitrogen compound, the metal nitrogen compound being embedded in an electronically or mixed-conductive network containing transition metal. However, irreversible reactions, such as electrolyte decomposition and/or the formation of a passivating layer on the surface of particulate or sheet metal components of the anode, in particular their electrochemically active components, may also be involved. The lithium irreversibly consumed in this way indirectly increases the gravimetric capacity of a rechargeable lithium battery cell, otherwise lithium from another source, for example a lithium oxygen compound selected from $Li_2O$, $Li_2O_2$, $LiO_2$ and/or another cathode material such as a lithium transition metal oxide, must be used for this purpose. In the case of lithium hydride, the hydrogen gas produced during the release of lithium, which is non-reactive with respect to the remaining cell components, in particular the electrolyte, escapes from the battery cell, while in the case of the said lithium oxygen compounds, oxygen gas reactive with the electrolyte is produced. If the lithium used for passivation or protective layer formation originates from a lithium transition metal oxide introduced into the cathode, the delithiated material, i.e. $Li_{x-\delta}MO_y$ ($\delta$=0 to x; x and y can assume values between 1 and 10) or completely lithium-free transition metal oxide remains. This can no longer participate in the battery docking process due to a lack of lithium, so it represents an electrochemically inactive mass that lowers the energy density of the system. In this case, the lithium hydride formed according to the invention acts as an elegant prelithiation agent.

The half reactions that take place in the cathode during the cyclization of a rechargeable electrochemical cell look like the following:

 (5)

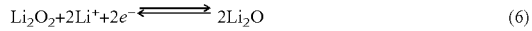 (6)

 (7)

(5) to (7) read from left to right are discharge reactions. The double arrows shall symbolize that these are reversible processes (provided that there is sufficient electronic or mixed contacting).

The electrochemically active lithium compounds selected from lithium hydroxide (LiOH), lithium oxide ($Li_2O$), lithium peroxide ($Li_2O_2$) and/or lithium superoxide ($LiO_2$) and optionally lithium hydride (LiH) must be embedded in an electronically or mixed conductive network consisting of finely divided transition metal particles and/or finely divided conductive transition metal oxide compounds with an electrochemical potential (lithium intercalation potential) of >2 V against $Li/Li^+$. It is important to ensure the closest possible contact between the electrochemically active lithium compounds and the transition metal or conductive transition metal oxide compounds with an electrochemical potential>2 V. It is also advantageous if the latter as well as the electronically or mixed-conductive transition metal oxide compounds with an electrochemical potential of >2 V against Li/Li+ are present in as finely divided, i.e. amorphous or nanoparticulate form as possible. The exact dimensions of the preferred nanoparticulate impression depend on the mechanical form factor (i.e. the three-dimensional shape of the particles). In case of spherical (or similar) particle shapes, these are 0.1-100 nm, preferably 1-30 nm.

The solid components of the cathode composite material can be crushed and brought into close contact with each other by a grinding process, preferably using a high-energy mill. Using a planetary ball mill, nanoparticulate forms of lithium oxygen compounds and electronically or mixed conductive transition metals or transition metal oxide compounds with an electrochemical potential of >2 V against $Li/Li^+$ are obtained in this way. Nanoparticulate particle morphologies can also be produced by alternative physical (vapor deposition, plasma and laser methods) or chemical processes, such as solvent-based processes, preferably sol/gel processes.

The molar ratio between the finely divided transition metals and/or the electronically or mixed-conductive transition metal oxide compounds on the one hand and the active materials based on lithium oxygen compounds selected from LiOH, $Li_2O$, $Li_2O_2$ and $LiO_2$ on the other hand in the cathode is in the range of 1:100 to 1:1, preferably 1:50 to 1:1.5.

The transition metal M is preferably the elements of the 3rd to 12th group of the periodic table of the elements, especially preferably M=Sc, Ti, Zr, Hf, V, Cr, Mo, W, Mn, Fe, Ni, Co, Cu, Ag, Zn as well as the rare earth metals La, Ce, Pr, Nd, Sm, Gd, Dy, Ho, Er, TM, Yb and Lu or any mixture of the mentioned transition metals.

Electronically conductive transition metal oxides with M=a metal of the 3rd to 12th group of the periodic table of the elements are are used as transition metal oxide compounds. Binary ($MO_x$) as well as ternary ($MM'_yO_x$) and higher mixed phases can be used, wherein the other metal M' at least is another transition metal from the 3rd to 12th group of the periodic system and/or the element lithium, ($Li_yMO_x$). Where: w, y=0 to 8; x=0.5 to 4.

The following metal oxide compounds are preferably used: binary metal oxides such as titanium oxides (TiO, $Ti_2O_3$), vanadium oxides ($V_2O_3$, VO, $VO_2$), iron oxides ($Fe_3O_4$, FeO), cobalt oxides ($CoO_2$, $Co_3O_4$), nickel oxides ($Ni_2O_3$), manganese oxides ($MnO_2$, $Mn_3O_4$), chromium oxides ($CrO_2$, $Cr_2O_3$), niobium oxides (NbO); layer structured lithium metal oxides ($LiCoO_2$, $LiNiO_2$, Li(Ni,Mn,Co)$O_2$), $LiV_3O_8$; spinel structured lithium metal oxides ($LiMn_2O_4$, $LiMnNiO_2$, $LiNi_{0.5}Mn_{1.5}O_4$, $LiV_3O_5$; inverse spinel structured lithium metal oxides ($LiNiVO_4$, $LiCoVO_4$); olivine structured lithium metal oxides ($LiFePO_4$, $LiVPO_4$). The chemical formulas listed above indicate the ideal compositions of the basic compounds. In practice, however, these are used in slightly or more modified form. These include materials with structure-stabilizing dopants (e.g. Al stabilized Li-nickel cobalt oxide, "NCA") or compounds doped with foreign metals or non-metals to increase conductivity. Such variants of the parent compounds modified by doping can also be used if the invention is applicable.

Particularly preferred is the use of electronically or mixed-conductive transition metal oxides and lithium transition metal oxides, which can reversibly release and insert lithium. In these cases, the additional electrochemical capacitance of these conductivity enhancers can be used if their electrochemical potential is approximately the same as that of the electrochemically active lithium oxygen compounds (approx. 3 V). The electronic conductivity at room temperature of the metal oxide compounds that can be used according to the invention is at least $10^{-7}$ S/cm, preferably at least $10^{-6}$ S/cm and especially preferred at least $10^{-5}$ S/cm.

The high-energy rechargeable battery, according to the invention, has a negative electrode (anode) containing a material with an electrochemical potential<2 V against Li/Li'. These can be: graphitic materials (graphite itself, hard carbon, graphene and the like); metallic lithium; elements capable of being alloyed with lithium (e.g. aluminum, silicon, germanium, tin, lead, boron, zinc, mixtures thereof) and lithium-containing compounds of the metallic elements mentioned; transition metal nitrides (nitridometalates) $(MM'_yN_x)$ with M=a metal of the 3rd to 12th group of the periodic system of the elements and M'=at least one further transition metal from group 3 to 12 of the periodic system and/or the element lithium, $(Li_yMN_x)$ and where y=0 to 8; x=0.5 to 1; metal nitrogen compounds of the general formulae

  (I) and

  (II), wherein (I) and (II) can be present in any mixing ratio and $M^2$=an alkaline earth element (Mg, Ca, Sr, Ba or any mixture thereof) and x=0–4; z=0–2 m=1 or 0; n=1 or 0, wherein (m+n)=1.

In the fully charged (lithium-richest) state, the metallic nitrogen compounds correspond to the general formulas (III) and/or (IV)

  (III)

  (IV), wherein (III) and (IV) can be present in any mixing ratio and $M^2$=alkaline earth element (Mg, Ca, Sr, Ba or any mixture thereof)

x=0–4; z=0–2 m=1 or 0; n=1 or 0, wherein (m+n)=1.

Metal nitrogen compounds are preferably used as electrochemically active anode materials, whereby the metal nitrogen compounds are embedded in a transition metal-containing electronically or mixed-conductive network. The electrochemically active metal nitrogen compound has a composition in the fully discharged (lithium-poorest) state of charge which is indicated by at least one of the two general formulas (I) and/or (II). The transition metal-containing electronically or mixed-conductive network contains finely divided transition metals M in elementary form or finely divided conductive interstitial transition metal compounds with an electrochemical potential (lithium intercalation potential) of <2.5 V against Li/Li'.

The transition metal powders M are preferably the elements of the 3rd to 12th group of the periodic table of the elements, especially preferably M=Sc, Ti, Zr, Hf, V, Cr, Mo, W, Mn, Fe, Co, Ni, Cu, Ag, Zn as well as the rare earth metals La, Ce, Pr, Nd, Sm, Gd, Dy, Ho, Er, Tm, Yb and Lu or any mixture of the mentioned transition metals.

Electronically conductive interstitial compounds with an electrochemical potential (lithium intercalation potential) of <2.5 V against Li/Li$^+$ are used as transition metal compounds. These are preferably transition metal nitrides (nitridometallates) and/or transition metal carbides, each with M=a metal of the 3rd to 12th group of the periodic table of the elements and/or transition metal hydrides with M=a metal of the 3rd to 10th group of the periodic table of the elements. Binary ($MN_x$, $MC_x$, $MH_x$) as well as ternary ($MM'_yN_x$; $MM'_yC_x$; $MM'_yH_x$) and higher mixed phases can be used, wherein the further metal M' is at least one further transition metal from the 3rd to 12th group of the periodic table of the elements, ($MxM'_yN_z$) and/or the element lithium, ($Li_yMN_x$; $Li_yMC_x$; $Li_wM_xM'_yN_z$; $Li_wM_xM'_yH_z$; etc). Where: w, y=0 to 8; x=0.5 to 1; z=0 to 3.

In the discharged (low lithium) state according to generic formula (I), the nitridometalates preferably consist of at least one of the following compounds: $Li_2NH$, MgNH, CaNH, $Li_2Mg(NH)_2$, $Li_2Ca(NH)_2$, $MgCa(NH)_2$, $Li_4Mg(NH)_3$, $Li_2Mg_2(NH)_3$ and/or one or more of the following compounds according to generic formula (II): $LiNH_2$, $Mg(NH_2)_2$, $Ca(NH_2)_2$.

If the high-energy battery according to the invention is charged by applying an external voltage, the active N-containing anode materials change into a lithium-rich state. When fully charged, the lithium-rich compounds are formed according to the generic formula (III), preferably: $Li_4NH$, $Li_2MgNH$, $Li_2CaNH$, $Li_6Mg(NH)_2$, $Li_6Ca(NH)_2$, $Li_4MgCa(NH)_2$, $Li_{10}Mg(NH)_3$, $Li_8Mg_2(NH)_3$ and/or according to generic formula (IV), preferably: $Li_3N$, MgLiN, CaLiN and LiH.

The above mentioned transition metal compounds with the qualitative composition $Li_wM_xM'_yE_z$ (E=N, C, H; w, y=0 to 8; x=0.5 to 1; z=0 to 3) belong to the group of so-called interstitial metal compounds or alloys, i.e. the intercalated foreign elements E, which are carbon, nitrogen or hydrogen, are arranged on interstitial layers (interstitial sites) of the underlying metal lattice. The stoichiometries indicated indicate the highest content(s) (limit stoichiometries) of carbon, nitrogen or hydrogen, respectively. However, the interstitial compounds are not exactly stoichiometric compounds, i.e. all compositions starting from pure metal up to the limit stoichiometry are usually possible and mostly stable. All compounds with lower contents of foreign elements, i.e. qualitatively represented by $Li_wM_xM'_yE_{z-\delta}$ ($\delta$ can take any value between 0 and z) are also electronically or mixed-conducting materials and therefore are suitable for the production of nitrogen-containing composite anode materials.

The electronically conductive transition metals or their corresponding also electronically conductive nitride, carbide or hydride compounds preferably are used in finely dispersed form (nanoparticles). They can be mixed as homogeneously as possible by a physical mixing process with the likewise nanoparticulate lithium nitrogen-containing anode material, whereby good contact between the individual particles is ensured by subsequent pressing (in technical manufacturing processes generally by calendering) during anode strip production and the fully functional nitrogen- and transition metal-containing composite anode material is obtained. Suitable composite anode materials can also be produced by chemical processes, e.g. reactions with nitrogen sources. The preferred nitrogen sources are elemental nitrogen ($N_2$); ammonia ($NH_3$); hydrazine ($N_2H_4$); urea ($CH_4N_2O$). In ammonolysis with $NH_3$, the metals, i.e.

lithium and the selected transition metals, are reacted with ammonia preferably at elevated temperatures and under pressure. The amide compounds obtained can then be further converted by subsequent thermolysis, e.g. into imide compounds and/or nitrides. If non-nitridic conductivity improvers are desired, appropriate transition metal hydrides and/or transition metal carbides can be added before or after ammonolysis. After removal of excess ammonia, the remaining solids can be ground together. This measure reduces particle size and improves contacting. During the reaction with nitrogen at mostly increased temperatures and pressures, nitridic phases are formed immediately. Also in this case, desired non-nitridic conductivity enhancers can be added.

In a preferred embodiment of the invention, the lithium nitrogen-containing anode materials are co-milled with the conductivity improving transition metals or the nitrides, carbides or hydrides. A high-energy mill, for example of the type of a planetary ball mill, is used for grinding.

Other materials that improve the functionality of the anode can be added to the nitrogen-containing composite anode materials. These include above all non-metal-based conductivity enhancers, lithium-donating additives and binders. All conductive forms of elemental carbon (graphite, carbon black, graphene, carbon nanotubes) are suitable as non-metal-based conductivity enhancers. Lithium metal (preferably coated, i.e. surface passivated and in powder form or as thin foil) or lithium-rich compounds such as lithium graphite ($LiC_{6-\delta}$, $\delta$=0-5) or coated lithium silicides ($Li_nSiO_x@Li_2O$) can be used as lithium-donating additives. The organic polyamides normally used for electrode manufacture can be used as binders. These include PTFE, PVdF, polyisobutylene (e.g. Oppanole® from BASF) and similar materials. In the nitrogen- and transition metal-containing composite anode material, the weight ratio between the finely divided transition metal or the electronically or mixedly conductive transition metal compound $LiwM_xM'_yE_z$(E=N, C, H; w, y=0 to 8; x=0.5 to 1; z=0 to 3) on the one hand and the nitrogen-containing electrochemically active nitrogen-containing anode material on the other hand is generally between 1:100 and 1:2. The ready-to-use (complete) nitrogen and transition metal-containing composite anode may also contain other conductivity improvers (up to 30 wt %), binders (up to 20 wt %) and/or prelithizers (up to 20 wt %).

Anodes containing metallic lithium are also preferred, where the lithium is either in the form of a sheet metal or powder electrode or as an alloy with a metal selected from silicon, tin, boron and aluminum.

As electrolytes for the rechargeable high-energy battery according to the invention with an anion-redox-active composite cathode, wherein the composite cathode, which in the state prior to the first discharge contains lithium hydroxide embedded in an electronically or mixed-conductive network and optionally additionally one or more lithium oxygen compounds selected from $Li_2O$, $Li_2O_2$ and $LiO_2$, can be of the types (liquid, gel, polymer and solid electrolytes) which are common to the skilled person. As conducting salt for liquid, polymer and gel-polymer systems, soluble lithium salts with weakly coordinating, oxidation stable anions are used in the matrix used. These include for example $LiPF_6$, lithium fluoroalkyl phosphates, $LiBF_4$, imide salts (e.g. $LiN(SO_2CF_3)_2$), $LiOSO_2CF_3$, methide salts (e.g. $LiC(SO_2CF_3)_3$), $LiClO_4$, lithium chelatoborates (e.g. $LiB(C_2O_4)_2$, also called "LiBOB"), lithium fluorochelatoborates (e.g. $LiC_2O_4BF_2$, called "LiDFOB"), lithium chelatophosphates (e.g. $LiP(C_2O_4)_3$, called "LiTOP") and lithium fluorochelatophosphates (e.g. $Li(C_2O_4)_2PF_2$). Salts with anions that are stable against anion dissociation and are fluorine-free are particularly preferred.

Solid state electrolytes, i.e. Li-ion conductive glasses, ceramics or crystalline inorganic solids are also particularly preferred. Examples of such materials are: lithium thiophosphates (e.g. $Li_3PS_4$), argyrodite ($Li_6PS_5X$ with X=Cl, Br, I), phosphido silicates (e.g. $Li_2SiP_2$), nitridophosphates (e.g. $Li_{2.9}PO_{3.3}N_{0.36}$), nitridoborophosphates (e.g. $Li_{47}B_3P_{14}N_{42}$), metal sulfide phosphates (e.g. $Li_{10}GeP_2S_{11}$), garnets (e.g. $Li_7La_3Zr_2O_{12}$), titanium phosphates ($Li_{1.5}Al_{0.5}Ti_{1.5}(PO_4)_3$) and boron hydride compounds (e.g. $LiBH_4$, and $Li_2B_{12}H_{12}$).

The anode compartment is separated from the cathode compartment by a lithium ion permeable but electronically insulating separator (e.g. consisting of microporous polyolefins) or a solid state electrolyte (of the inorganic solid or solid polymer material type).

The invention is explained using the following examples:

EXAMPLE 1: PRODUCTION OF A LITHIUM HYDROXIDE-CONTAINING COMPOSITE CATHODE BY GRINDING (TRANSITION METAL OXIDE AND CARBON BLACK AS CONDUCTIVITY ENHANCERS)

In an Ar-filled glove box, 0.9 g $Co_3O_4$ (<50 nm, supplier Aldrich), 3.6 g anhydrous lithium hydroxide powder (supplier Albemarle Germany) and 0.2 g carbon black (AB 400) were premixed in a beaker. The homogenized mixture was filled into a 50 mL zirconia ceramic grinding beaker together with approx. 27 g 3 mm zirconia ceramic balls and sealed. The mixture was then ground in a planetary ball mill (Pulverisette P7 from Fritsch) for 240 minutes at 900 rotations per minute (rpm).

The grinding bowl was put back into the Ar-filled glove box and opened there. The ground product was separated from the grinding media by sieving.

Yield: 4.1 g fine powder

EXAMPLE 2: PRODUCTION OF A LITHIUM HYDROXIDE CONTAINING COMPOSITE CATHODE BY A SOLVENT-BASED PROCESS (TRANSITION METAL OXIDE AS CONDUCTIVITY IMPROVER)

1.2 g cobalt chloride (97% from Aldrich), 0.69 g lithium peroxide (>93% from Albemarle Germany) and 3.6 g anhydrous lithium hydroxide powder (Albemarle Germany) were dissolved or suspended in 50 ml anhydrous ethanol and homogenized with a high-energy stirrer (Ultraturrax IKA T 65) for 15 minutes. The resulting suspension was magnetically stirred for 4 h at RT and then filtered.

The filter residue was first pre-dried in a vacuum and then sintered for 5 h at 300° C. in an oxygen atmosphere.

Yield: 3.6 g fine powder

The powder contains 15% $Co_3O_4$ and approximately 73% LiOH; the remainder to 100% consists essentially of lithium oxide.

The invention claimed is:
1. A method for producing a rechargeable high-energy battery with an anion-redox-active composite cathode, characterized in that the anion-redox-active composite cathode contains lithium hydroxide as an electrochemically active constituent, which method comprises
   mixing and contacting the lithium hydroxide with electronically or mixed-conductive transition metals and/or electronically or mixed-conductive transition metal oxides, to form an electronically or mixed-conductive network, applying the electronically or mixed-conductive network to a current drain to form the anion-redox-active composite cathode, placing the anion-redox-active composite cathode thus formed in a cell housing together with a separator, a lithium-conductive electrolyte and a lithium-containing anode, to form an electrochemical cell, and subjecting the electrochemical cell to at least one initial forming cycle.

2. The method according to claim 1, characterized in that the lithium hydroxide is mixed with lithium oxygen compounds selected from lithium oxide, lithium peroxide and lithium superoxide, the proportion of LiOH in the lithium oxygen compounds being at least 10 mol %, based on the total content of lithium oxygen compounds.

3. The method according to claim 2, characterized in that the electronically or mixed-conductive transition metals and/or electronically or mixed-conductive transition metal oxides and the lithium oxygen compounds selected from LiOH, $Li_2O$, $Li_2O_2$ and $LiO_2$ and are used in a molar ratio of 1:100 to 1:1, and wherein the transition metals and/or transition metal oxides are finely-divided.

4. The method according to claim 1, characterized in that the electronically or mixed-conductive transition metals are selected from elements of the 3rd to 12th group of the periodic table of the elements, or any desired mixture of said transition metals.

5. The method according to claim 1, characterized in that the electronically or mixed-conductive transition metal oxides are selected from: binary metal oxides, layer-structured lithium metal oxides, spinel-structured lithium metal oxides, inverse-spinel-structured lithium metal oxides and/or olivine-structured lithium metal oxides.

6. The method according to claim 5, characterized in that the binary metal oxides are selected from titanium oxides, vanadium oxides, iron oxides, cobalt oxides, nickel oxides, manganese oxides, chromium oxides, niobium oxides; the layer structured lithium metal oxides are selected from $LiCoO_2$, $LiNiO_2$, $Li(Ni,Mn,Co)O_2$, $LiV_3O_8$; the spinel structured lithium metal oxides are selected from $LiMn_2O_4$, $LiMnNiO_2$, $LiNi_{0.5}Mn_{1.5}O_4$, $LiV_3O_5$; the inverse spinel structured lithium metal oxides are selected from $LiNiVO_4$, $LiCoVO_4$; and the olivine structured lithium metal oxides are selected from $LiFePO_4$, $LiVPO_4$.

7. The method according to claim 1, characterized in that the electronically or mixed-conductive transition metals and/or electronically or mixed-conductive transition metal oxides are present in finely divided, amorphous or nanoparticulate form with particle dimensions in the range of 0.1-100 nm.

8. The method according to claim 1, characterized in that metallic lithium is used as the lithium-containing anode, the metallic lithium being present either as a sheet metal or powder electrode or as an alloy with a metal selected from silicon, tin, boron and aluminium.

9. The method according to claim 1, characterized in that a molar amount of lithium which can be electrochemically extracted from the lithium-containing anode is introduced into the lithium-containing anode before the first discharge cycle, which molar amount of lithium corresponds to at least half, the molar amount of the LiOH content present in the anion-redox-active composite cathode.

10. The method according to claim 1, characterized in that non-metal-based conductivity improvers and binders are used in the anion-redox-active composite cathode and optionally also in the lithium-containing anode.

11. The method according to claim 10, characterized in that graphitic materials such as graphite, hard carbon, carbon black and graphene are used as non-metal-based conductivity improvers.

12. The method according to claim 1, characterized in that both the anion-redox-active composite cathode and the lithium-containing anode are densified by a pressing process or calendering.

13. The method according to claim 1, characterized in that solid components of the anion-redox-active composite cathode that are in solid form are brought into close contact with one another by comminuting by a grinding process.

14. A high-energy battery with an anion-redox-active composite cathode, characterized in that the anion-redox-active composite cathode, prior to the first electrochemical discharge, consists of a composite material which contains an electronically or mixed-conductive network comprising lithium oxygen compounds comprising at least lithium hydroxide, and optionally lithium oxide, lithium peroxide and/or lithium superoxide and electronically conductive transition metals and/or electronically or mixed-conductive transition metal oxides, wherein the electronically or mixed-conductive network components and the lithium oxygen compounds are present in a molar ratio of 1:100 to 1:1.

15. The high-energy battery according to claim 14, characterized in that the high-energy battery has an anode containing at least one lithium-donating component or compound with an electrochemical potential of <2 V against the Li/Li+ reference electrode, selected from metallic lithium, a lithium-containing metal alloy, a lithium nitrido transition metalate or composite materials whose electrochemically active component is a metallic nitrogen compound, the composite materials whose electrochemically active component is a metallic nitrogen compound latter being embedded in a transition metal-containing, electronically or mixed-conductive network.

16. The method according to claim 2, characterized in that the lithium oxygen compounds are in finely divided, amorphous or nanoparticulate form with particle dimensions in the range of 0.1-100 nm.

17. The method according to claim 1, characterized in that the electronically or mixed-conductive transition metals and/or electronically or mixed-conductive transition metal oxides and the lithium hydroxide are used in a molar ratio of 1:100 to 1:1, wherein the electronically or mixed-conductive transition metals and/or electronically or mixed-conductive transition metal oxides are finely divided, and optionally wherein the electronically or mixed-conductive transition metals and/or electronically or mixed-conductive transition metal oxides as well as the lithium hydroxide are present homogeneously mixed in finely divided, amorphous or nanoparticulate form with particle dimensions in the range of 0.1-100 nm.

* * * * *